US010694177B2

(12) United States Patent
Harris et al.

(10) Patent No.: US 10,694,177 B2
(45) Date of Patent: *Jun. 23, 2020

(54) DISTANCE TO FAULT MEASUREMENTS IN CABLE TV NETWORKS

(71) Applicant: VIAVI SOLUTIONS INC., Milpitas, CA (US)

(72) Inventors: Kyle Harris, Indianapolis, IN (US); Daniel K. Chappell, Greenwood, IN (US)

(73) Assignee: VIAVI SOLUTIONS INC, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,232

(22) Filed: Nov. 2, 2017

(65) Prior Publication Data

US 2018/0184081 A1 Jun. 28, 2018

Related U.S. Application Data

(63) Continuation of application No. 14/811,630, filed on Jul. 28, 2015, now Pat. No. 9,838,679.

(51) Int. Cl.
*H04N 7/173* (2011.01)
*H04N 17/00* (2006.01)
*H04B 3/46* (2015.01)

(52) U.S. Cl.
CPC ............. *H04N 17/004* (2013.01); *H04B 3/46* (2013.01); *H04N 17/00* (2013.01)

(58) Field of Classification Search
CPC .................. H04N 17/004; H04B 3/46
See application file for complete search history.

(56) References Cited

U.S. PATENT DOCUMENTS

| 5,352,984 | A | 10/1994 | Piesinger | |
|---|---|---|---|---|
| 6,279,137 | B1 * | 8/2001 | Poeppelman | ..... H03M 13/1515 714/781 |
| 7,173,431 | B1 | 2/2007 | Lo | |
| 8,559,813 | B2 | 10/2013 | Harman | |
| 9,838,679 | B2 * | 12/2017 | Harris | ...................... H04B 3/46 |
| 2004/0044489 | A1 * | 3/2004 | Jones | ...................... H04L 43/50 702/79 |
| 2011/0211827 | A1 | 9/2011 | Soto et al. | |
| 2014/0111184 | A1 * | 4/2014 | Dalebroux | ......... G01R 13/0236 324/76.39 |
| 2014/0161390 | A1 * | 6/2014 | Winzer | .................... G02B 6/14 385/28 |
| 2015/0009340 | A1 | 1/2015 | Chappell et al. | |
| 2015/0009795 | A1 | 1/2015 | Gray et al. | |

(Continued)

OTHER PUBLICATIONS

"Time Domain Reflectometry Theory", Application Note, Agilent Technologies, May 31. 2013, USA, pp. 1-16.

*Primary Examiner* — Kyu Chae
(74) *Attorney, Agent, or Firm* — Mannava & Kang, P.C.

(57) ABSTRACT

A TDR technique for performing in-service distance-to-fault measurements in cable TV networks is disclosed. Using a cable network tester configured to generate chirped probe pulses and to perform pulse-matched filtering and averaging of received echoes, network faults may be detected without interfering with the downstream reception. The probe pulse transmission may be timed to take advantage of the error correction coding in the network.

20 Claims, 8 Drawing Sheets

(56) References Cited

U.S. PATENT DOCUMENTS

2015/0016816 A1* 1/2015 Piehler ................ H04B 10/071
                                                    398/10
2015/0020128 A1* 1/2015 Maxson .................. H04B 3/46
                                                    725/107
2015/0020129 A1   1/2015 Chappell et al.
2016/0112214 A1* 4/2016 Currivan ................ H04B 3/46
                                                    375/222

* cited by examiner (b)

DISTANCE TO FAULT MEASUREMENTS IN CABLE TV NETWORKS

PRIORITY

This application is a Continuation of commonly assigned and co-pending U.S. patent application Ser. No. 14/811,630, filed Jul. 28, 2015.

TECHNICAL FIELD

The present disclosure generally relates to testing and monitoring of cable TV networks, and more particularly relates to devices and methods for locating faults in a cable TV network.

BACKGROUND

Providers of digital television (DTV) services typically use two-way hybrid fiber-coaxial (HFC) networks, which are shared bi-directional networks with point-to-multipoint transmission in the downstream direction using digital signals or a mix of analog and digital signals, and multipoint-to-point transmission in the upstream direction. Signals are distributed via a fiber optic connection from a head-end to a node that converts the optical signal to an electrical signal and then distributes the signals to residences via a tree and branch coaxial cable distribution network termed 'cable plant'. At the subscriber side, terminal equipment supports the delivery of cable services, which may include video, data and voice services, to subscribers via cable modems.

Delivery of data services over cable networks, and in particular cable television (CATV) networks, is typically compliant with a Data Over Cable Service Interface Specifications (DOCSIS®) standard. The term 'DOCSIS' generally refers to a group of specifications published by Cable-Labs that define industry standards for cable headend equipment, such as Cable Modem Termination System (CMTS), and cable modem (CM) equipment. The physical layer specification of DOCSIS provides for the use of frequency multiplexing and several specific forms of quadrature amplitude modulation (QAM) for both upstream (CM to headend) and downstream (headend to CM) communications. Upstream and downstream signals occupy separate frequency bands called upstream and downstream frequency bands. Downstream information channel signals co-propagate in the downstream frequency band, and upstream signals co-propagate in the upstream frequency band. The frequency separation of the upstream and the downstream signals allows bidirectional amplification of these signals, which propagate in a common cable in opposite directions. In the United States, most of the cable equipment installed at the time of the writing complies with the DOCSIS 3.0 version of the DOCSIS standard, which provides for the upstream spectral band from 5 MHz to 42 MHz typically, with the downstream channels using 64-QAM or 256-QAM modulation format and 6 MHz spacing within the downstream spectral band spanning from 50 MHz to 860 MHz. The upstream channel widths are configurable and may take a set of define values between 200 kHz and 6.4 MHz, each corresponding to a specific symbol rate, with the upstream data modulated with either QPSK, 16-QAM, 32-QAM, 64-QAM or 128-QAM.

The upstream and downstream signals are prone to impairments that may originate at a plurality of network locations in the network. As the result of the "tree" structure of the cable plant, there may be numerous devices, cable segments and connectors located between the fiber optic node and the end user. This provides for a plurality of locations were a defect can occur, resulting in either no service or a reduced service to the end user. In order to ensure adequate performance, the cable plant needs to be monitored and tested and the source of impairments identified and located.

Tracing the source of impairment typically requires that a technician travels to different network locations and compares measurements to locate the impairment. Portable network testing devices currently used in the industry may help to identify certain types of defects in the cable plant by performing specific spectral and noise measurements in the upstream and/or downstream directions using specialized testing methods at different network locations. A number of tests can also be performed to evaluate quality of digital TV signal transmission on higher logical levels of data transmission, for example by measuring such parameters as carrier level or amplitude, modulation error ratio (MER), bit error rate (BER), ingress under carrier (IUC), and other parameters. The measurements may be performed on channel-by-channel basis, each channel diagnostic data being summarized on a separate screen or data page viewed by the technician on the tester's visual display.

One type of defects that may be particularly hard to locate are defects that lead to changes in impedance along the signal path in the cable plant. These defects may be caused by cable corrosion, which may result from the cable getting scratched and the outer shield rusting away due to exposure to water, "rodent chews", crushed, pinched or kinked cables, opens, shorts or partials in the cable. Impedance changes may also be caused by set screws inside housings, i.e. the screws that connect the center conductor of the cable to internal circuits of the amplifiers, splitters, taps, and fiber nodes, becoming loose if they are under-torqued or causing oxidation through the galvanic process if they are over torqued. Defects of these types may be located using time domain reflectometry (TDR), which may include launching a short pulse into the cable and detecting reflections from the location of the impedance change, with the time delay between the transmission and the reflection indicating the distance to the fault. This may, however, require that the service to the customers be disconnected during the measurements so that the strong TDR pulses do not interfere with the downstream TV signals at the end user locations, and the weak reflected TDR pulses are not obscured by the upstream DTV signals from the end users. As the service to many customers may be impacted due to the tree structure of the cable plant, cable operators are understandably reluctant to perform such measurements due to potential customer complaints. Another approach could be to replace all possibly suspicious connections, cables and/or devices hoping that the defected part is among them. Drawbacks of this approach includes increased costs and that the root cause of the problem remains un-identified.

Accordingly, it may be understood that there may be significant problems and shortcomings associated with current solutions and technologies for locating impedance-changing faults in a cable TV network.

SUMMARY

Accordingly, the present disclosure relates to a method and device for locating a fault in a cable TV network using chirped TDR pulses to spread TDR pulse energy over a relatively long time interval, and further using pulse-matched filtering to process signals returned from the cable network and to magnify echoes of the TDR pulses that may be comprised therein.

According to one aspect of the present disclosure, the method includes using a cable network tester comprising a signal transmitter and a signal receive, the method further comprising: a) using the signal transmitter of the network tester to generate a pulsed probe signal and to launch said pulsed probe signal into the cable TV network, wherein the pulse probe signal comprises a probe pulse that is characterized by a probe signal frequency that sweeps across a pre-defined probe frequency band over the duration of the probe pulse; b) using the signal receiver of the network tester to receive a return signal from the cable TV network; c) filtering the return signal with a matched filter that is matched to the probe pulse; and d) analyzing the return signal to identify one or more peaks therein corresponding to one or more echoes of the probe pulse reflected at a fault location in the network.

Another aspect of the present disclosure relates to a cable network tester for locating a fault in a cable TV network, comprising: a signal transmitter configured to generate a pulsed probe signal and to launch said pulsed probe signal into the cable TV network, wherein the pulse probe signal comprises a probe pulse that is characterized by a probe signal frequency that sweeps across a pre-defined probe frequency band over the duration of the probe pulse; a signal receiver configured to receive a return signal from the cable TV network and comprising a matched filter that is matched to the probe pulse for filtering the return signal therewith and for amplifying in magnitude one or more echoes of the probe pulse in the return signal; and, a processor for analyzing the return signal to identify one or more peaks therein corresponding to the one or more echoes of the probe pulse reflected at a fault location in the network.

According to a feature of one or more embodiments disclosed herein, the duration of each probe pulse and/or a repetition rate of the probe pulse generation may be selected so that symbol errors that may be caused by collisions of probe pulses with downstream signals at the subscriber end are correctable by an error correction scheme used by the cable network in the downstream transmission.

BRIEF DESCRIPTION OF THE DRAWINGS

Embodiments disclosed herein will be described in greater detail with reference to the accompanying drawings which represent preferred embodiments thereof, in which like elements are indicated with like reference numerals, and wherein.

DETAILED DESCRIPTION

In the following description, for purposes of explanation and not limitation, specific details are set forth, such as particular circuits, circuit components, techniques, etc. in order to provide a thorough understanding of the present disclosure. However, it will be apparent to one skilled in the art that aspects of the present disclosure may be practiced in other embodiments that depart from these specific details. In other instances, detailed descriptions of well-known methods, devices, and circuits are omitted so as not to obscure the description. The appearances of the phrase "in one embodiment" in various places in the specification are not necessarily all referring to the same embodiment, nor are separate or alternative embodiments mutually exclusive of other embodiments. Note that as used herein, the terms "first", "second" and so forth are not intended to imply sequential ordering, but rather are intended to distinguish one element from another unless explicitly stated. Furthermore, the following abbreviations may be used:

HFC Hybrid Fiber-Coaxial
LAN Local Area Network
ASIC Application Specific Integrated Circuit
FPGA Field Programmable Gate Array
DSP Digital Signal Processor
QAM Quadrature Amplitude Modulation
CPE Customer Premises Equipment
CMTS Cable Modem Termination System
RF Radio Frequency
RAM Random Access Memory
ADC Analog to Digital Converter
DAC Digital to Analog Converter
DOCSIS Data Over Cable Service Interface Specification Exemplary embodiments described hereinbelow relate to a method and a related apparatus for in-service location of faults in a cable TV network using time domain reflectometry (TDR) with chirped TDR pulses. Advantageously, the method may be implemented in a multi-function portable cable TV tester that can also perform other cable test functions known in the art, such as, for example, channel scan for active upstream and downstream channels, upstream channel demodulation and error analysis, etc.

Figure 1:
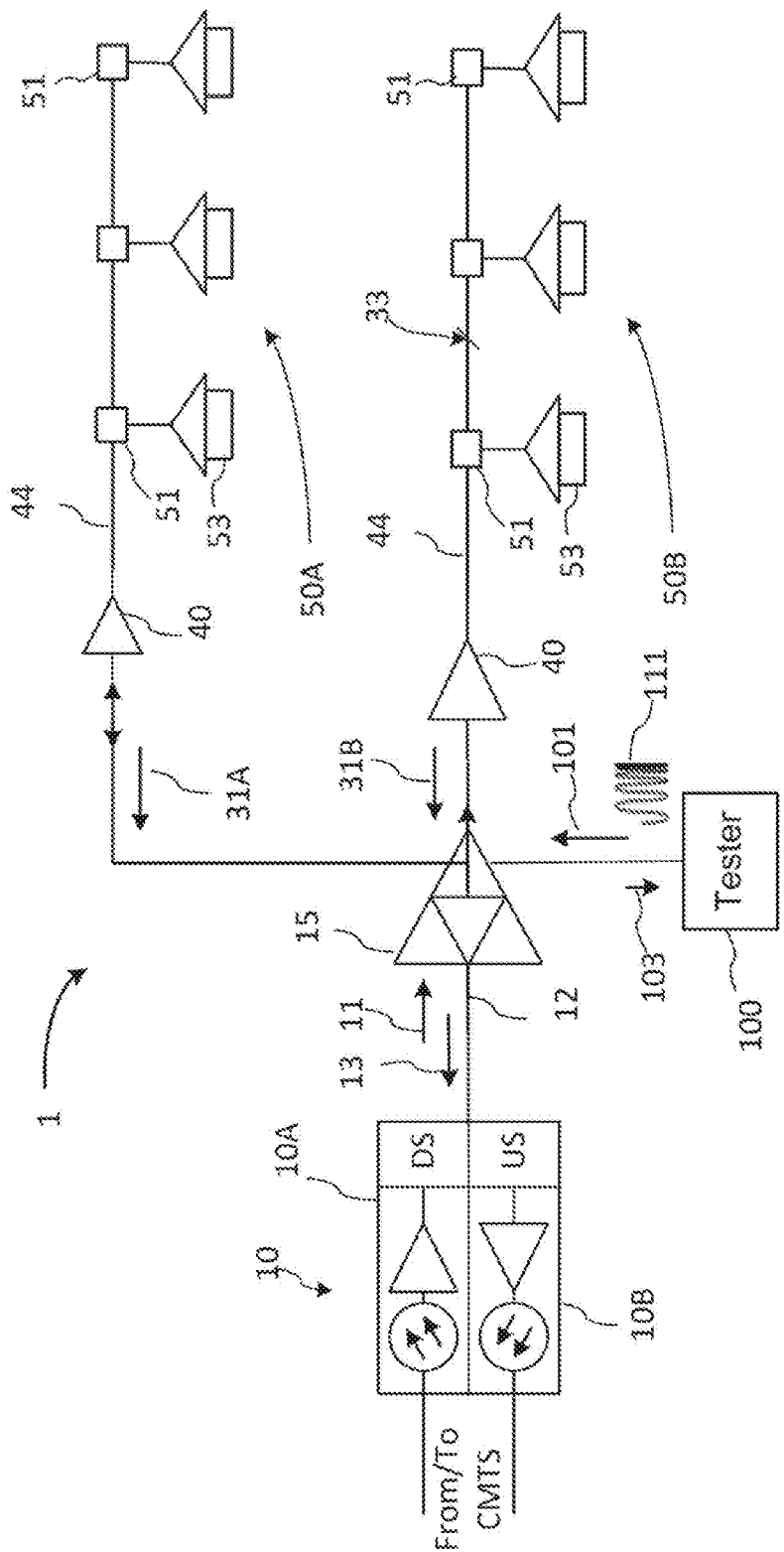
FIG. 1 is a schematic block diagram of a portion of a cable network.

With reference to FIG. 1, there is shown a schematic diagram of an exemplary cable TV network 1 wherein embodiments of the present disclosure may be practiced. The exemplary cable TV network 1, which is also referred to herein simply as the cable network 1, may be a local portion of an HFC network that delivers Cable Television (CATV) signals, including digital TV signals and data and control signals, to end users. It will be appreciated however that methods and techniques described herein can also be used in other types of wired communication networks, including but not limited to those using QAM formats, such as for example DVB-T based digital TV systems, OFDM-based networks, DSL networks, and other types of networks, possibly with modifications which would be evident to those skilled in the art on the basis of the present disclosure.

As illustrated in FIG. 1, a fiber-optic node 10 of the cable network 1 includes a downstream (DS) optoelectronic converter 10A that converts downstream (DS) optical signals generated by a remote CMTS (not shown) into downstream electrical RF signals 11, and an upstream (US) electro-optic converter 10B that converts upstream (US) electrical RF signals 13 into US optical signals for upstream transmission to the remote CMTS. The fiber-optic node 10 is coupled via a coaxial cable 12 to a bidirectional amplifier 15, which amplifies the downstream RF signals 11 for distribution to first and second groups of homes 50A and 50B. The downstream RF signals 11 generated by the downstream optoelectronic converter 10A of the fiber node 10 are distributed to a plurality of end-of-the-line subscribers, or end users, at customer premises or homes 53, via one or more trunk coaxial cables 44 and subscriber taps 51. At the customer premises 53, the DS signals are demodulated using cable modems (not shown). One or more two-way trunk RF amplifiers 40 may further be provided in each trunk cable 44 to suitably amplify the upstream and downstream CATV signals on their way to and from the subscriber premises 53. The first and second groups of homes 50A, 50B may send upstream signals 31A and 31B, respectively, which may be combined by the signal transmitter 110 into the upstream RF signal 13 propagating towards the fiber node 106 for delivering to the remote CMTS at the headend (not shown).

A cable network tester 100 may be connected to the cable network 1 at a desired test point where the tester can inject a probe signal 101 into the network in the downstream or upstream direction and receive back from the cable network return signals 103. The cable network tester 100, which is also referred to herein simply as tester 100, may be configured for testing a signal path in the cable network 1, including determining the location of a fault in the cable network 1.

The cable network 1 may serve a large number of homes 53, which may be connected by taps 51 to a plurality of different cable trunks 44 at a plurality of different locations. The trunk cables 44 may be buried into the ground or they may be elevated above the ground on utility poles, or a combination of both. Various faults and defects can occur anywhere in the network 1, resulting in a lost or reduced service to the end users 53. Many types of defects typically cause an abrupt change in the impedance along a signal propagation path in the network; such defects or faults include kinks, breaks or rust in the coaxial cables, rusty or otherwise imperfect cable connections and connections within various cable equipment along the signal path, etc. These and other types of cable plant faults tend to reflect back RF signals incident upon them and may be discovered using principles of time domain reflectometry (TDR). The TDR typically involves sending a short impulse of a duration τ along a signal transmission path and waiting for any echoes of the pulse that may return back as the result of the impulse reflection from the locations of the abrupt impedance change in the transmission line caused by a fault. The distance to the fault (DTF) l=v·T/2 may then be estimated by measuring the time T elapsed between the sending of the original pulse and the reception of its echo based on an expected value v of the speed of propagation of the TDR pulse along the transmission path. The range resolution δR~vτ/2 of this technique is defined by the pulse duration τ, so that shorter pulses generally yield better resolution.

One potential issue that may be associated with using the short-pulse TDR technique in a cable TV network such as the cable network 1 is that the TDR pulses of a sufficiently high energy may be needed due to relatively high cable losses and to detect low-reflectivity defects, and such pulses may interfere with the cable TV signals at the subscriber premises. Another possible issue associated with using the short-pulse TDR technique in the cable TV network 1 is that the echoes of the TDR pulse may be difficult to detect in the presence of the US signals 31A, 31B generated by the end user equipment at 53. These issues may be resolved by taking the network 1 out of operation during the TDR measurement, which is undesirable.

Figure 2:
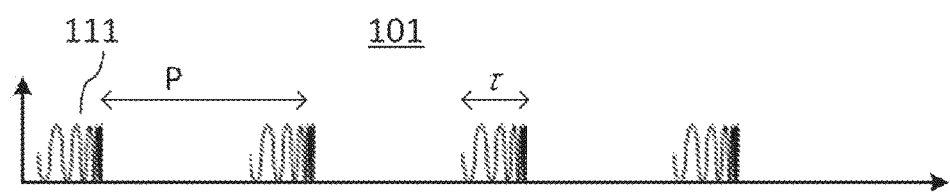
FIG. 2 is a schematic representation of a chirped probe signal that may be used for locating faults in a cable network.

In order to address one or more of these issues, tester 100 may implement an improved TDR technique as described hereinbelow with reference to FIGS. 2-9. The technique includes launching a pulsed probe signal 101 that is comprised of one or more frequency-chirped probe pulses 111 into a cable network, and monitoring a return signal 103 from the network for echoes of these frequency-chirped probe pulses originating a network fault. The one or more frequency-chirped probe pulses 111 are electrical pulses that are formed of an oscillatory electrical signal which oscillation frequency f is "swept", i.e. continuously increased or decreased, in time during each pulse across a pre-defined frequency sweep band ($f_{max}$, $f_{min}$) between a minimum frequency $f_{min}$ and a maximum frequency $f_{max}$. The frequency sweep band ($f_{max}$, $f_{min}$) is also referred to herein as the probe frequency band. By way of example, tester 100 may be connected to cable network 1 in a manner allowing it to inject the frequency-chirped pulsed probe signal 101 into the downstream direction, and to receive the return signal 103 propagating in the upstream direction. The return signal 103 may generally include echoes of the probe signal 101 reflected from various locations in the network downstream from tester 100, and upstream signals generated by the end users. One advantage of using the frequency-chirped probe pulses 111 for locating faults in an operational cable network is that the pulse energy may be spread over a comparatively longer time period, i.e. the pulse duration τ, which may enable either reducing the power of the probe signal in order to lessen the interference with the downstream signals for the end users, or increasing the signal to noise ratio (SNR) when detecting the reflected echoes, or both. The frequency-chirped probe pulses 111 may also be referred to herein as the frequency-swept (probe) pulses 111 or simply as probe pulses 111. In one embodiment the frequency f, which may also be referred to herein as the probe signal frequency, may be changing linearly in time from $f_{min}$ to $f_{max}$ during the duration of the pulse, in which case the probe pulses 111 may be referred to as linearly frequency modulated (LFM) pulses or as the LFM TDR pulses. In other embodiments, the dependence of the probe signal frequency on time f(t) within each probe pulse 111 may deviate from linear. An example of the pulsed probe signal 101 that is composed of a sequence of the frequency-swept probe pulses 111 of a pulse duration τ and pulse period P is schematically illustrated in FIG. 2.

The return signal 103 may be processed using a pulse compression technique based on the known waveform of the probe pulse 111, which enables achieving a higher time-bandwidth product than for an equivalent CW pulsed signal. This results in an impulse signal that combines the higher signal to noise ratio (SNR) of a long duration pulse with the higher range resolution of the short pulse. The range, or distance-to-fault (DTF), resolution δR of this TDR technique may be estimated from the width B=($f_{max}-f_{min}$) of the probe frequency band:

$$\delta R = v/(2B) \tag{1}$$

By way of example, using chirped probe pulses 111 with B=80 MHz may yield the range (DTF) resolution of about 1.5 m, assuming v~0.85·c, where c is the speed of light in vacuum.

Figure 3:
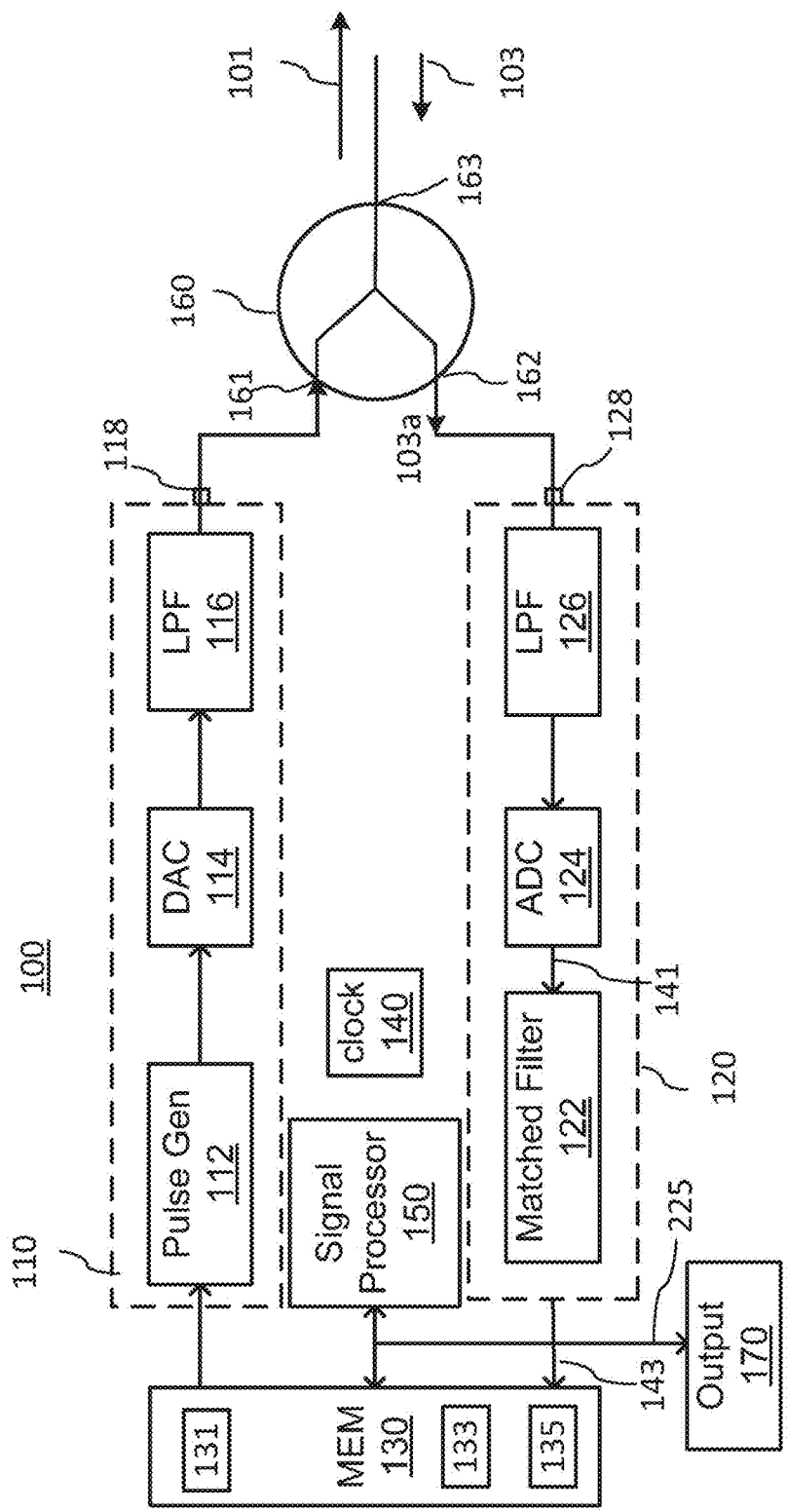
FIG. 3 is a schematic block diagram of a cable network tester for locating faults in a cable network.

Referring now to FIG. 3, there is schematically illustrated a an exemplary block diagram of the cable network tester 100 that is configured for implementing an embodiment of the chirped-pulse TDR technique for determining fault locations in the cable network 1. The exemplary cable network tester 100, hereinafter also referred to as tester 100, may include a signal transmitter 110 coupled to an output cable port 118, and a signal receiver 120 coupled to an input cable port 128. The signal transmitter 110 includes a probe pulse generator 112 for generating the probe signal 101, which may be followed by a DAC 114 that may in turn be followed by an optional output filter 116, which in one embodiment may be a low-pass filter having a bandwidth B. The signal receiver 120 includes an optional input filter 126, which may be for example a low pass filter having the same or different bandwidth as the output filter 116, and which may be followed by an ADC 124, which output is passed to a matched filter 122. One or more memory devices 130, hereinafter referred to as memory 130, may further be provided and may be operatively coupled to the pulse generator 112 and the matched filter 122. A return signal processor (RSP) 150 may be coupled to the memory 130 and configured for processing the return signal 103 after it passed the matched filter 122 as described hereinbelow, which may include processing the return signal for presenting to a viewer in a form suitable for extracting ranging information therefrom, identifying locations of possible faults in the cable plant, and estimating the DTF. An output device 170, such as a suitable display, that is coupled to the return signal processor 150 may further be provided for outputting, e.g. displaying, results of the processing.

The return signal processor 150, pulse generator 112, and matched filter 122 may be embodied using a single dedicated or shared hardware processor or using multiple hardware processors, and/or a combination of software and digital hardware. Examples of hardware processors that may be used to implement blocks 112, 122, 150 include digital signal processor (DSP), Application Specific Integrated Circuit (ASIC), Field programmable Gate Array (FPGA), network processor, system on a chip such as an FPGA with integrated ARM or micro processor, Complex Programmable Logic Device (CPLD), Erasable programmable logic device (EPLD), Simple programmable logic device (SPLD), or macrocell array. In one exemplary embodiment, a hardware processor implementing the return signal processor 150, such as a DSP, a suitable microcontroller, or a general purpose processor, runs a software or firmware program or programs including computer instructions for performing one or more operations described hereinbelow with reference to blocks 250, 330, 340, 350 in FIGS. 4 and 7; functionality of this software program will become apparent from the description hereinbelow and may include one or more of the following: dividing a saved sample or duration of the return signal in tine-domain slices synchronized to consecutive probe pulses 111, averaging the signal slices to obtain a cable response characteristics, and calibrating the cable response characteristics. In one embodiment, this software program is executable by a hardware processor implementing RSP 150 and is stored in a non-volatile memory (not shown) that is coupled to the hardware processor. In one embodiment, the pulse generator 112 and the matched filter 122 may be embodied as hardware logic, for example using an FPGA. The memory 130 may be embodied, for example, as RAM or as a combination of RAM and a non-volatile memory device.

One or more modes of operation of tester 100 will now be described with reference to FIG. 3, and further with reference to flowcharts shown in FIGS. 4 and 7, which illustrate embodiments of the method for locating faults in a cable network using tester 100 according to the present disclosure.

Figure 4:
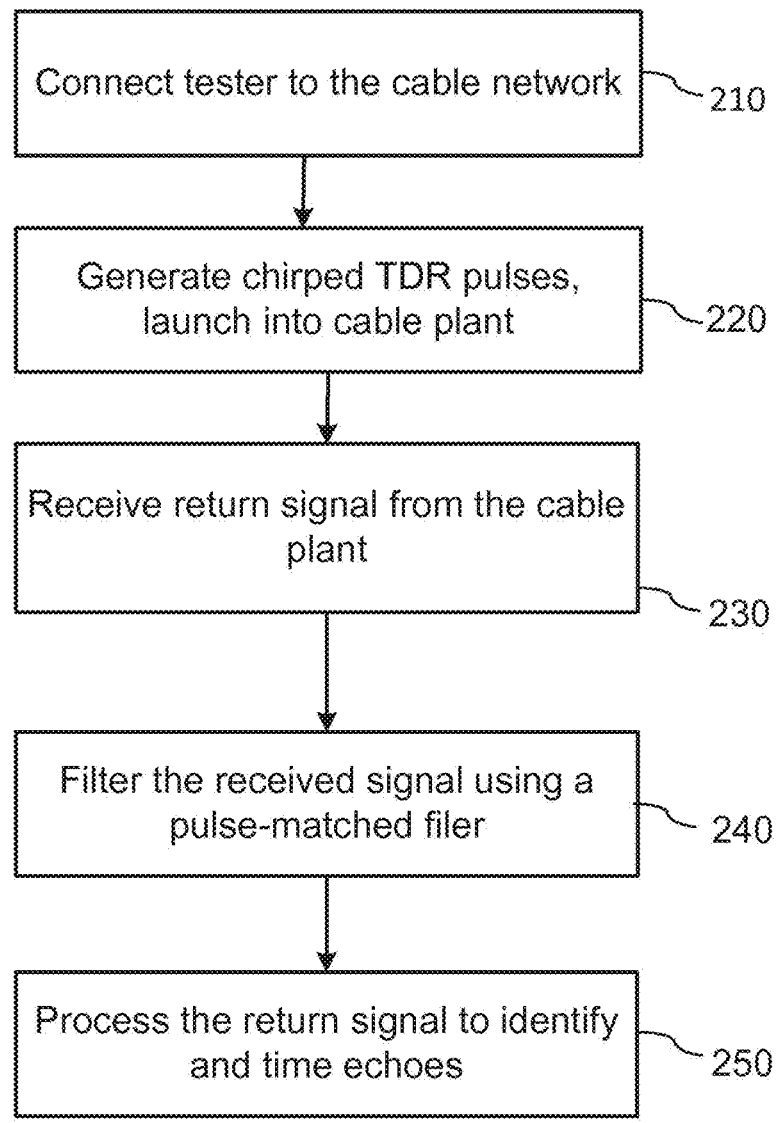
FIG. 4 is a flowchart of an embodiment of a method for locating faults in a cable network using chirped probe pulses.

Turning first to the flowchart of FIG. 4 while continuing to refer to FIG. 3, one embodiment of the method may start with an optional step or operation 210 wherein a technician connects tester 100 to the cable network 1 at a suitable location for launching the probe signal 101 into a section of the network to be tested. This operation may be omitted if tester 100 is already connected to the network, for example if tester 100 is installed in the network on a permanent or semi-permanent basis. When present, this step may include connecting tester 100 to a cable connection point in the network using a suitable Y-type three-port connector 160, if tester 100 has separate output and input ports 118, 128 as illustrated in FIG. 3, and these two ports are separately utilized for the transmission of the pulsed TDR signal 101 and for receiving the return signal 103. The three-port connector 160 includes a first port 161, a second port 162 and a third port 163, and is configured so that a signal received in the first port 161 is transmitted out of the third port 163, and a signal received in the third port 163 is transmitted out of the second port 162. Step 210 may include connecting the first and second ports 161, 162 of the Y-type connector 160 to the output and input ports 118, 128 of tester 100, respectively, and connecting the third port 163 of the Y-type connector 160 to a cable connection point in the cable network 1. In one embodiment, the pulsed probe signals received in the first port 161 may also be coupled into the second port 162, which may be utilized in some embodiments for probe pulse-echo synchronization as described hereinbelow. The Y-type connector 160 may be embodied, for example, as a three-leg summing resistor network of the type schematically illustrated in FIG. 6B.

Once the tester is connected to the cable network 1, the method proceeds to step or operation 220 wherein the signal transmitter 110 of the tester 100 generates the pulsed probe signal 101 and launches it into the cable TV network through the output port 118 of the tester 100. The pulsed probe signal 101 includes at least one probe pulse 111 during which the probe signal frequency f sweeps across the pre-defined probe frequency band ($f_{min}$, $f_{max}$), as described hereinabove. Once launched into the cable plant, the probe pulse 111 propagates through the coaxial cables and installed equipment of the cable network 1, experiencing attenuation and reflections from impedance discontinuities in its path, such as those that may occur due to faults or imperfect cable connections. By way of example, FIG. 1 indicates the location of a cable fault 33 where the probe pulses 111 are partially reflected back towards the tester 100. The reflected echo or echoes of the probe pulse 111 will propagate in the reverse direction, reaching the tester 100 as the return signal 103, with a time delay T relative to the time of the transmission of the probe pulse 111 that is indicative of the distance to the fault from the tester. At step 230 the return signal 103 is received by the signal receiver 120 of the tester 100, where it may be optionally passed through the input filter 126. The received return signal 103 is passed to the matched filter 122 at step 240. The matched filter 122 is matched to the probe pulse 111 for compressing the received echoes of the probe pulses 111 in time, for example as described hereinbelow. At step 250, the return signal passed through the matched filter 122 is analyzed by the signal processor 150 to identify one or more peaks therein corresponding to the echoes of the probe pulse or pulses 111 reflected at the fault location 33 in the cable network.

The generation of the probe pulses 111 and the matched filtering of the return pulses may each be performed either digitally or using suitable analog circuitry. In the embodiment illustrated in FIG. 3, both the initial generation of the probe pulses 111 and the matched filtering of the echoes is performed in the digital domain using one or more digital processors embodying the probe pulse generator 112 and the matched filter 122, such as for example an FPGA or an ASIC. In the shown embodiment, the pulse generator component 112 may be in the form of a logic circuit, for example defined in an FPGA, that loads a digital waveform of the pulse from a binary file saved in memory 130, and sends it to the DAC 114 for converting it into the analogue probe signal 103. The return signal 103 received by the tester 100 is digitized by the ADC 124 prior to the matched filtering operation, which in the shown embodiment is performed in the digital domain by a digital logic embodying the matched filter 122, which by way of example may be defined in the same FPGA or ASIC or in a different hardware processor.

In one embodiment, the digital waveform of the probe pulse 111 may be generated, for example using a computer code, as a burst of an oscillatory LFM signal, such as for example a sampled sine wave of a desired length, which frequency is changing linearly in time, and then saved in a memory region 131 of memory 130 that is readable by the pulse generation logic 112. In operation the pulse generation logic 122 may load the saved burst waveform, scale it as required and output to the DAC 114 for converting into the chirped probe pulse 111. The length and the rate of frequency change of the saved digital waveform of the pulse may be selected for a given sampling rate of the DAC 114 so as to provide the pre-determined duration τ of the probe pulse and the desired minimum and maximum values $f_{min}$, $f_{max}$ of the probe pulse frequency. By way of example, $f_{min}$ may be equal to zero, and $f_{max}$ may be in tens of MHz or greater, and the digital waveform may be converted to a desired bit depth prior to saving, for example 12 bit full scale value. The maximum frequency $f_{max}$, and therefore the bandwidth $B=(f_{max}-f_{min})$ of the probe pulses 111, may be limited by the sampling rate of DAC 114 and the output filter 116. By way of example, the sampling rate of DAC 114 may be 204.8 MHz, which limits $f_{max}$ and the pulse bandwidth B to 102.4 MHz. The bandwidth B of the pulsed signal 101 at the output of tester 100 may be further limited by the output filter 116. In some of the exemplary embodiments described herein $f_{max}$ is taken to be equal to about 80 MHz, although one skilled in the art will appreciate that this is not a requirement, and other values of the maximum frequency $f_{max}$ of the chirped pulses and of their bandwidth B may also be realized, as supported by the used DAC and the output filter bandwidth. Further by way of example, the duration τ of the probe pulse or burst may be in the range of 2 to 5 microseconds (μs), but may also be outside of this range. Some of possible considerations that may guide the selection of the probe pulse duration τ are described hereinbelow. In one embodiment, the pulse generator 112 may generate a digital probe signal wherein the digital probe pulse is periodically or aperiodically repeated, with a buffer of zeros of sufficient length placed between the pulses. The length of the buffer spacing between the probe pulses may be selected so as to allow time for the echoes of the probe pulse 111 to return into the tester unimpeded by the next probe pulse 111 being transmitted.

Figure 5:
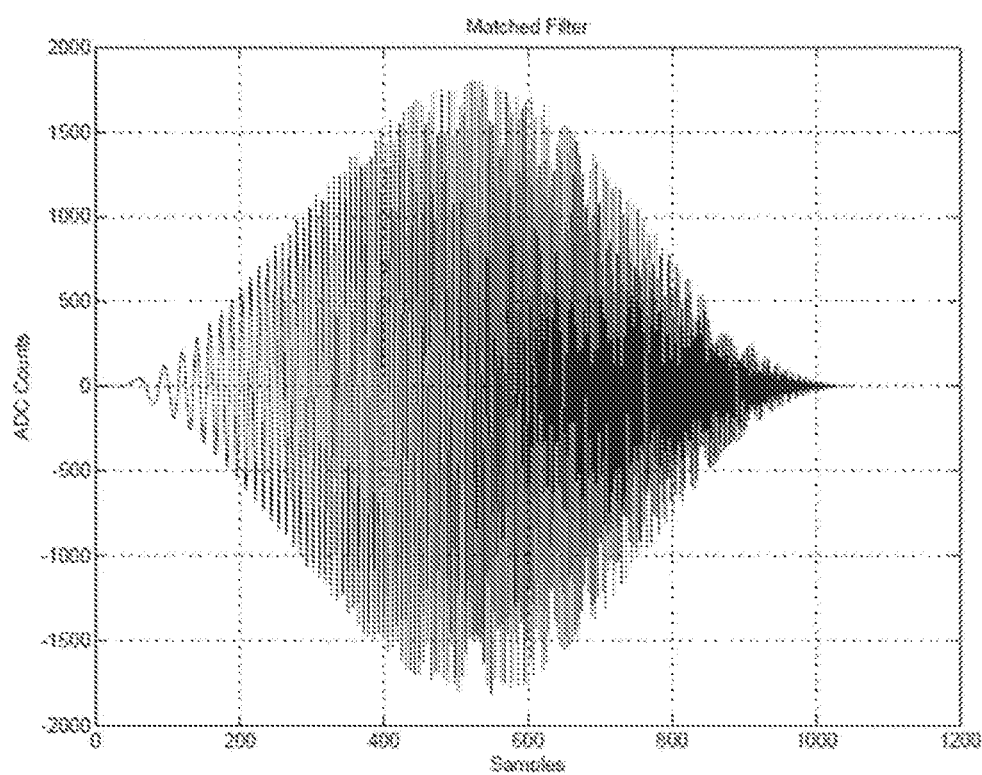
FIG. 5 is a graph representing a matched filter waveform.

In one embodiment, the matched filter 122 is a digital filter that performs, substantially, a cross-correlation of the received signal 103 with a waveform that substantially reproduces the waveform of the probe pulse 111; this cross-correlation may be computed in the digital domain by convolving the matched filter waveform with the digitized return signal, producing peaks at the time points of maximum correlation of the received signal 103 with the matched filter. As the result, echoes of the probe pulse 111 are compressed in time and increased in amplitude relative to all other signals that may be present in the return signal 103, including the upstream signals from the subscribers. Thus, the use of the chirped probe pulses 111 in combination with the matched filtering of the returned signals 103 makes it easier to detect echoes of the probe signal in the presence of upstream TV signals from the subscribers by selectively amplifying the echoes of the probe pulses. The matched filter waveform may be created, for example, by terminating to the ground the third Y-connector port 163, which in operation would be connected to the cable under test, and capturing in memory 130 a copy of a chirped probe pulse 111 that is generated by the signal transmitter 110 and received in the input port 128 from the output port 118 through the bridge 160, after it is digitized by the ADC 124 without passing through the matched filter 122. The captured pulse is substantially the probe pulse 111 generated by the signal transmitter 110 that is shaped by the input filter 126 and possibly transmission responses of other components of the tester frontend. Optionally a Hanning or other suitable window may be applied to the captured pulse for sidelobe attenuation as known in the art, and the resulting filter waveform saved into a binary file. An example of the matched filter waveform, with the optional Hanning window applied to it, is illustrated in FIG. 5.

In order to determine the time delay T between the launching of the probe pulse 111 into the cable plant and the return of an echo pulse corresponding thereto, the return signal 103 received from the cable plant should be synchronized to transmission of the probe pulses 111. In one embodiment, tester 100 may include an internal clock 140 that provides a receiver-transmitter time synchronization, and may further include logic for marking the time of the probe pulse transmission in the digitized received signal that is provided to the return signal processor 150. In the absence of such internal synchronization mechanism, the desired synchronization may be facilitated by sending a copy of each probe pulse 111 from the output port 118 of the signal transmitter 110 directly into the input port 128 of the signal receiver 120 to provide the reference markers from which the delay T may be measured, for example as described hereinbelow.

Figure 6A:
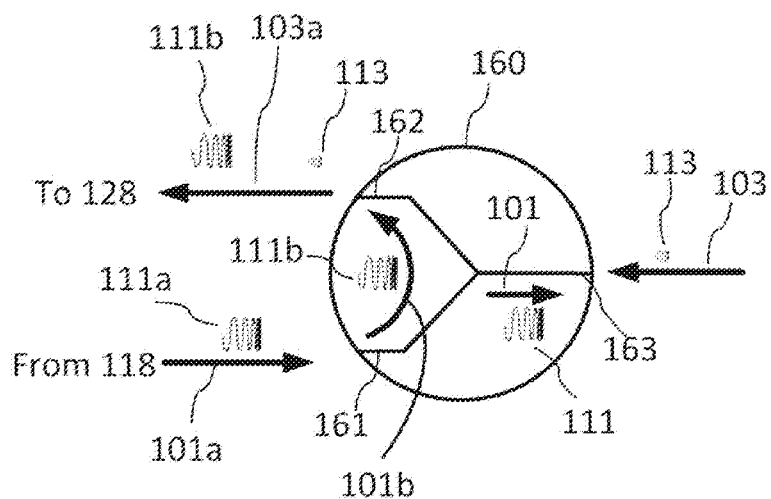
FIG. 6A is a schematic diagram illustrating signal connections through a Y-type connector at the output of the cable network tester of FIG. 3.
Figure 6B:
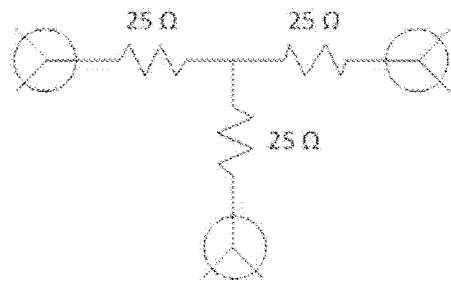
FIG. 6B is a schematic diagram illustrating an example three-leg summing resistor network implementing the Y-type connector of FIG. 6A.

Referring to FIG. 6A, in one embodiment the time synchronization between the pulse transmission and echo reception events may be accomplished using an embodiment of the three-port coupler 160 that splits the probe signal 101a received form the output port 118 of the signal transmitter 110 in two, sending a copy 111b of each probe pulse 111 launched into the cable plant directly into the input port 128 of the signal receiver 120. In this embodiment, the signal 103a received by the signal receiver 120 is a sum of the return signal 103 received from the cable plant and the direct signal 101b received directly from the signal transmitter 110, with the coupler 160 providing a shortcut between the output and input ports 118, 128 of the tester 100 circumventing the cable plant. Thus, in this embodiment the signal 103a received by the signal receiver 120 of tester 100 includes both the probe pulse copy 111b, which is received directly from the output port of the signal transmitter 110 and may be referred to herein as the direct pulse, and a return pulse 113, which is an echo of the probe pulse 111 resulting from the reflection of the latter at a fault in the cable plant, and which is typically much weaker than the direct pulse 111b. The return pulse 113 is also referred to herein as the echo pulse, or as the probe echo, or simply as the echo. The process of synchronization of the pulse transmission and reception events in the tester 100 may then include i) identifying the position or timing of the direct pulse 111b in the received signal 103a, ii) identifying the position or timing of a corresponding echo pulse 113 in the received signal 103a, and iii) determining the time delay T therebetween.

Figure 8A:
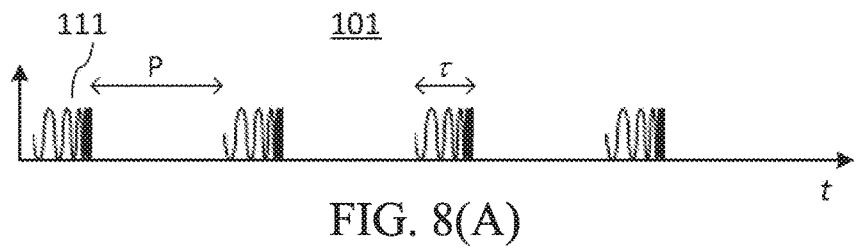
FIG. 8(A) is a graph illustrating a sequence of chirped probe pulses launched into the cable network.

In one embodiment, tester 100 may generate a sequence of the chirped probe pulses 111 as illustrated in FIG. 8(a), and perform an averaging of their echoes 113 to further suppress noise and increase the signal to noise ratio (SNR). Note that upstream signals 31 from the subscribers typically have characteristics of a random signal and therefore may also be suppressed by the averaging. The wait time P between the transmission of consecutive probe pulses 111 in the probe signal 101 should exceed a maximum expected value Tmax of the time delay T between the transmission of the probe pulse 111 and the receptions of its echo 113 for a desired maximum distance Dmax in the cable plant that tester 100 may probe. By way of example, for Dmax=1000 feet, the wait time P between consecutive pulses should exceed Tmax=2Dmax/v~2.4 µs.

Figure 7:
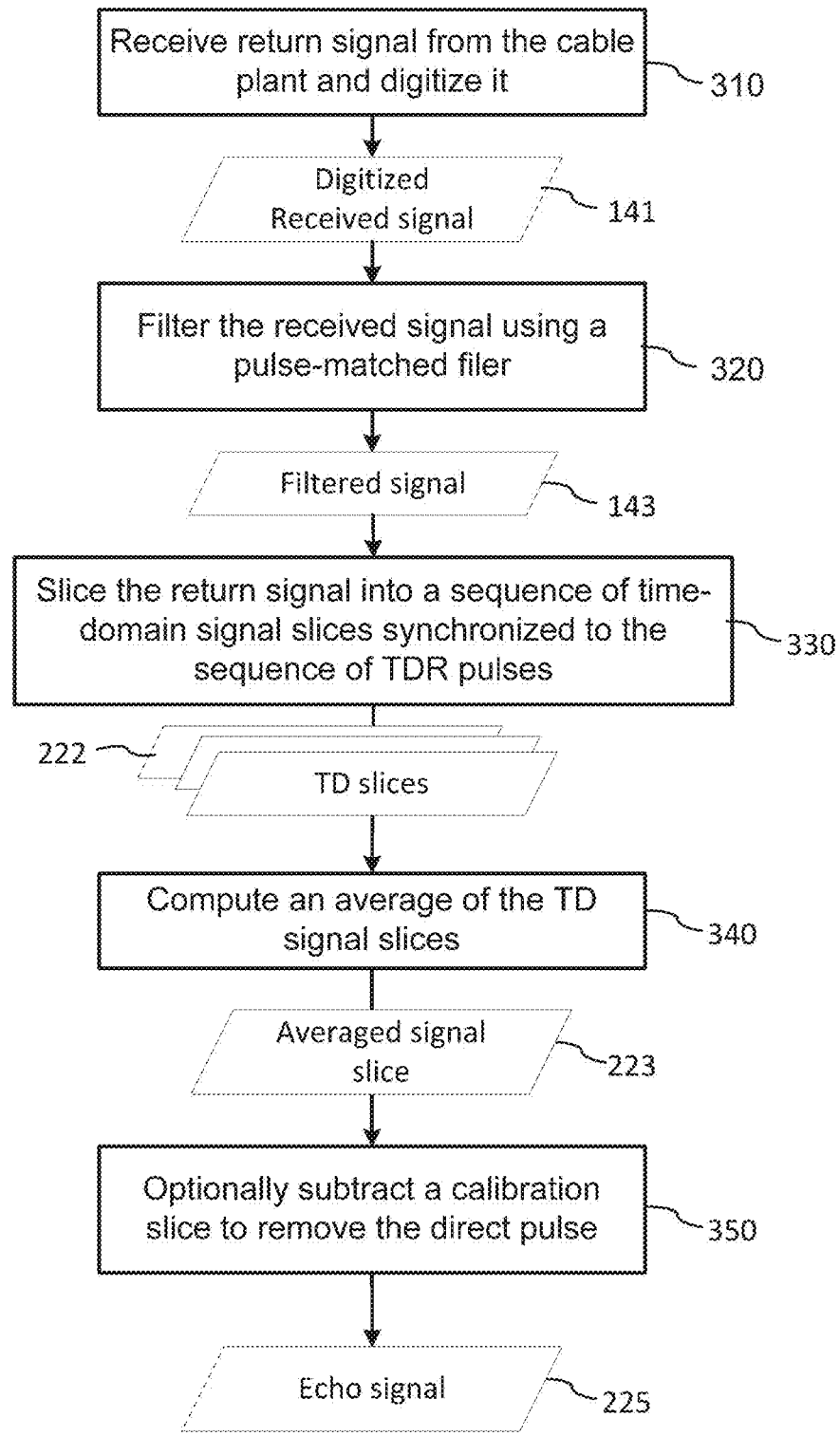
FIG. 7 is a flowchart illustrating processing of a return signal in an embodiment of the method of FIG. 4 for locating faults in a cable network.
Figure 8B:
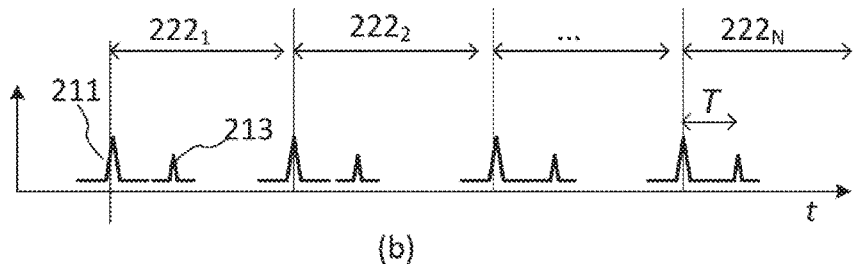
FIG. 8(B) is a graph illustrating the slicing of a return signal corresponding to the sequence of chirped probe pulses of FIG. 8(A), including directly received copies of the chirped probe pulses.

Referring now to FIG. 7, in one embodiment of the method tester 100 may implement the following steps or operations when processing the received signal 103 or 103a that is received at the input port 128 of the signal receiver 120. First, the received signal is digitized in step 310 using the ADC 124, which converts it into the digitized received signal 141. At step 320, this digitized received signal 141 is passed through the matched filter 122, which outputs a filtered received signal 143 wherein any signals that correlate with the probe pulse waveform are compressed in time and amplified in magnitude. FIG. 8(b) illustrates this filtered digital received signal for the embodiment wherein the received signal 103a includes the direct probe pulses 111b and their echoes 113 received from the cable plant. The matched filter operation converts these direct pulses 111b and echo pulses 113 into narrow peaks 211 and 213, with the bigger peaks 211 typically corresponding to the direct pulses 111b, and the smaller peaks 213 in-between them corresponding to their echo pulses 113 received from the cable plant.

From the output of the matched filter 122, a duration or sample of the filtered received signal 143 that includes a desired number N≥1 of the direct pulses 211 may be saved in a memory region 135 of memory 130 that is readable by the signal processor 150. In one embodiment, the signal processor 150 may be configured, for example programmed, to process the saved sample of the filtered received signal 143 as follows. At step 330, the saved sample of the filtered signal 143 is divided in time domain into a plurality of N>1 time-domain signal slices $222_1$ to $222_N$ that are synchronized to the sequence of probe pulses 111, i.e. each starting at a same position relative to a corresponding direct pulse peak 211. In one embodiment each of these signal slices, which are generally referred to herein as slices 222, includes one big peak 211 corresponding to a direct signal 101b and a certain duration of the received signal 103a that includes one or more smaller peaks 213 corresponding to the one or more echoes of the probe signal 101. By way of example, each signal slice 222 may start with one of the direct-pulse peaks 211 and have the same length or duration, i.e. have the same number of data points. The length, or duration, of each slice 222 may be selected so as to include echoes reflected anywhere within a desired length Dmax of the cable plant being probed.

The RSP 150 may include logic embodying a suitable algorithm for identifying the big peaks 211 in the saved sample of the received signal; this identification may be facilitated by ensuring that the direct pulses 111b received at the input port 118 exceed in amplitude or height any signal received from the cable plant. In one embodiment, the process of identifying the direct-pulse peaks 211 in the filtered signal 143 may first determine a maximum value in the saved sample of the filtered signal, and then find all peaks therein that exceed a certain percentage of the maximum signal value, for example are at least 90% thereof. The positions of the big peaks 211 in the saved signal sample 143 provide reference time points for obtaining the desired ranging information, i.e. determining the time delay T between the transmission of the probe pulses 111 and receiving back their echoes 113, from which the DTF may be computed.

In some embodiments tester 100 may implement an internal time synchronization between the transmission and reception events without requiring the sending of a copy of the probe pulses 111a from the output to the input port of the device. For example, a specific digital timing signal may be added to the output of the matched filter 122 every time a probe pulse is generated by the pulse generator 112, to provide a pulse transmission marker. The starting points of each slice 222 may then be identified in the saved received signal by the processor 150 in the absence of the big peaks 211 therein, with each slice 222 starting at a same position relative to a marker identifying the instance of transmission of one of the probe pulses 111.

At step 340, the processor 150 may perform an averaging operation on the time-domain slices 222 of the return signal to obtain an average signal slice 223 wherein noise is suppressed and the echo peak or peaks 213 may be easier to identify. The number of signal slices N used in the averaging may depend on the application, measurements conditions, strength of the back reflections in the cable plant, etc. Generally, the greater is the number of slices N, the better is the noise suppression and the longer is the measurement time and the stronger requirements on the device memory and processing speed. By way of example, the number of signal slices N in the 50-100 range should result in an additional 6-7 bits of DTF resolution, or about 36-42 dB SNR improvement.

In one embodiment, the method may include an optional calibration step 350 which produces a cable plant response characteristics, or an echo response, 225 wherein the direct-pulse peak 211 is removed so the presence of the strong direct pulse 111b wouldn't obscure the much weaker reflected signals 103 received from the cable plant, and the smaller echo peak or peaks 213 would be easier to identify. This step may include subtracting from the averaged signal slice 223 a calibration slice that includes the direct-pulse peak but not the return signal from the cable. This calibration slice may be obtained using a process that is similar to the creation of the matched filter waveform. It may include terminating to the ground the third port 163 of the three-port bridge 160, transmitting a suitably large number of the probe pulses 111a, and performing the operations 310-340 outlined hereinabove with reference to FIG. 7. The resulting direct response slice is saved in a memory region 133 of memory 130 and used as the calibration slice during normal operation as described hereinabove.

Once the calibration slice is subtracted out from the average slice 223, the resulting echo signal 225 may be processed, for example scaled, for presenting to the user. In one embodiment, the echo signal 225 may be logarithmically scaled, such as using a 20 log 10 (x) operation to obtain a magnitude ranging response in dB. This raging response may be plotted for the user as a function of time or distance along the cable plant, and/or passed for further analysis to a suitable peak detection algorithm that the RSP 150 may implement.

One advantage of using the chirped probe pulses for fault location in a cable network is that, by suitably selecting parameters of the probe pulse signal 101 such as the pulse width τ, the pulse spacing P and the pulse bandwidth B, the TDR measurements described hereinabove may be performed while the network 1 is in operation without significantly affecting subscriber services. Specific approaches to selecting at least some of these parameters will be described hereinbelow by way of example with reference to a cable TV network, such as that illustrated in FIG. 1, that implements data services according to Data-Over-Cable Service Interface Specification (DOCSIS), and in particular using upstream and downstream signals specified in DOCSIS 3.0, Annex B. It will be appreciated however that the approaches described hereinbelow can also be used in cable or other wired networks using alternative communication formats, possibly with modifications that would be evident to those skilled in the art based on the current disclosure.

In one embodiment, the cable network 1 may be a digital cable TV network wherein video and other information is transmitted to the end users over a plurality of downstream channels of a pre-defined width $B_{ch}$ each, with information-carrying signals in each channel modulated with sequences of symbols of a specific modulation format and duration $T_s$. One or more of these downstream channels may overlap in spectrum with the probe pulses 111, which may therefore interfere with the downstream signals in those channels at a subscriber modem when received at the same time. In accordance with one aspect of the present disclosure, the probe signal frequency is swept during each probe pulse over the probe bandwidth B that is greater than the channel bandwidth $B_{ch}$ of the downstream signals 11, which reduces the interference time $t_i$ by a factor $B_{ch}/B$:

$$t_i = \tau \cdot B_{ch}/B. \tag{2}$$

Here the interference time $t_i$, which may also be referred to herein as the collision time, is the time that the energy of a probe pulse 111 spends within the downstream channel bandwidth $B_{ch}$. By selecting B to be significantly greater than $B_{ch}$, for example by a factor of 10 or more, the interference time $t_i$ made quite small, thereby reducing negative effects of the interference on the subscriber. By way of example, $B_{ch}=6$ MHz, B=80 MHz, and the time $t_i$ any particular probe pulse may interfere with a downstream signal in any one downstream channel is shorter than the pulse duration τ by a factor of 0.075. Further by way of example, a probe pulse 111 of duration τ=2.48 μs may only affect any given downstream channel for a duration $t_i = \tau \cdot B_{ch}/B \sim 0.186$ μs, which compares to 0.18655 μs symbol duration $T_s$ specified for 256QAM transmission in DOCSIS 3.0.

In some embodiments, tester 100 may be configured to generate the probe signal 101 that takes advantage of error correction coding that is typically implemented in digital communications, including digital TV (DTV) signal transmission. The error correction coding used in the downstream signal transmission in DTV networks is typically designed for correcting bursts of errors up to a specific length, i.e. a maximum correctable burst duration $T_{bsrt}$, which may depend on a particular error correction coding scheme chosen for a given channel. Accordingly, in one embodiment the probe pulse duration τ and/or the probe pulse bandwidth B is/are selected so that the probe signal frequency f is swept over the channel bandwidth $B_{ch}$ faster than the maximum correctable burst duration $T_{brst}$, i.e.

$$t_i < T_{brst}, \tag{3}$$

which corresponds to choosing the probe pulse duration that satisfies the following condition:

$$\tau < T_{brst} \cdot B/B_{ch}. \tag{4}$$

Figure 9:
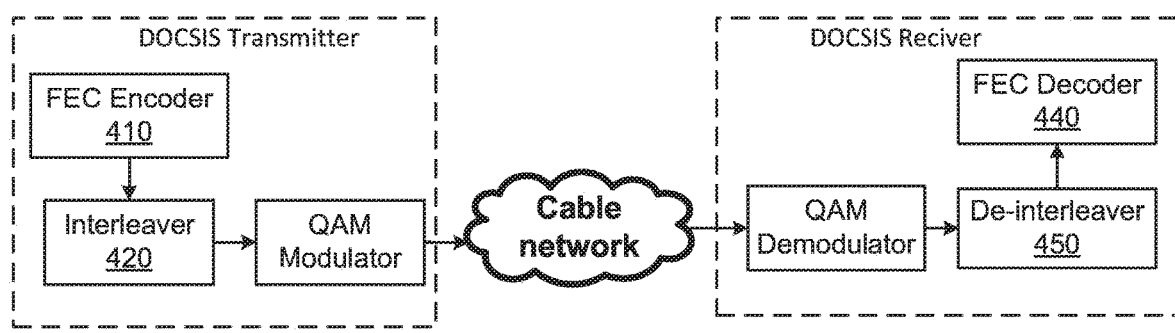
FIG. 9 is a schematic block diagram of the downstream signal transmission in a DTV network.

Referring to FIG. 9, the error correction schemes used in DTV networks typically include using a forward error correction (FEC) encoder 410 followed by an interleaver 420 at the DTV signal transmitter, and a de-interleaver 450 followed by a FEC decoder 440 in the receiver of the subscriber's modem. By way of example, the downstream signal transmission in DOCSIS 3.0 networks is specified in the International Telecommunication Union (ITU) Recommendation J.83B, "Digital Transmission of Television Signals, Annex B", which is incorporated herein by reference. This document specifies the use of either 64-QAM or 256-QAM modulation formats, and a Reed-Solomon encoder/decoder in combination with a variable-depth convolutional (I, J) interleaver in the downstream transmission. Table 1 lists some of the possible values of the number of taps I and the interleaving increment J, along with the corresponding values of the burst protection interval $T_{brst}$ (third column) and the interleaver latency L=((I−1)·I·$T_s$) (fourth column) for the 64-QAM and 128-QAM modulation formats defined in the J.83B Recommendation.

TABLE 1

| I (# of Taps) | J (Increment) | Burst protection 64QAM/256QAM | Latency 64QAM/256QAM |
| --- | --- | --- | --- |
| 8 | 16 | 5.9 μs/4.1 μs | 0.22 ms/0.15 ms |
| 16 | 8 | 12 μs/8.2 μs | 0.48 ms/0.33 ms |
| 32 | 4 | 24 μs/16 μs | 0.98 ms/0.68 ms |
| 64 | 2 | 47 μs/33 μs | 2.0 ms/1.4 ms |
| 128 | 1 | 95 μs/66 μs | 4.0 ms/2.8 ms |
| 128 | 2 | 190 μs/132 μs | 8.0 ms/5.6 ms |
| 128 | 8 | 759 μs/528 μs | 32 ms/22 ms |

By way of example, a DOCSIS 3.0 network may correct any potential errors that may be caused by a collision with a solitary probe pulse 111 up to about 40-50 μs duration, for the probe pulse bandwidth B=80 MHz and assuming the worst-case burst correction case of 256 QAM and (8,16) interleaver.

The burst correction capabilities specified in Table 1 are generally applicable when the error bursts of the specified maximum size happen infrequently. For example, they may not hold with respect to symbol errors that may be caused by a periodic sequence of the probe pulses with the period P that is smaller than the latency L of the interleaver 420 used in the downstream channel transmission. By way of example, the interleaver latency of the deepest (128,8) interleaver specified by DOCSIS 3.0 is about 32 ms for 64QAM DOSCIS signals, and about 22 ms for 256QAM DOSCIS signals having a shorter symbol duration. In order to estimate potential effects of the more frequent probe signal transmission on the subscribers of the cable services, the duration of potential interference $t_i=\tau \cdot B_{ch}/B$, i.e. the time interval during which any given probe pulse 111 may overlap in frequency with a downstream channel, may be compared to the duration $T_s$ of one symbol of the downstream DOCSIS signals. The probability of the probe pulses leading to symbol errors at reception may be reduced, for example, by selecting the probe signal parameters $\tau$ and/or B so that $t_i$ is significantly smaller than $T_s$.

Furthermore, we found that the risk of unrecoverable symbol errors due to a longer probe pulse may be completely avoided, or at least significantly reduced, by a proper timing of the probe pulses transmission, for example by synchronizing them with the FEC codeword frequency in the downstream channel. Indeed, it can be seen that by selecting $t_i \leq n \cdot T_s$, where n=1, 2, ... is an integer, no more than (n+1) consecutive downstream symbols may potentially experience an interference with any given probe pulse 111 at the reception. This interference may not lead to symbol errors after the de-modulation by the user modem if the downstream signal received by the modem is strong enough so that it can be decoded in the presence of the interference from the probe pulse. Furthermore, potential symbol errors caused by this interference may be corrected by the FEC decoder at the subscriber's modem if the number of symbols in each FEC codeword that may be affected by the probe signal 101 does not exceed the number of symbols m that the FEC decoder is capable of correcting. By way of example, the ITU Recommendation J.83B specifies the use of Reed-Solomon (RS) block (128, 122) code for FEC encoding/decoding, with a 128 symbol long codeword, or coding block, that is capable of correcting up to m=3 symbol errors per codeword. The same RS code is used for both 64-QAM and 256-QAM signals; the actual duration $T_{CW}$ of each codeword in the downstream signal is however different for the 64QAM and 256QAM signals due to the differing duration of individual symbols $T_s$ for these two modulation formats.

Accordingly, in one embodiment the probe pulses 111 are generated no more frequently than one probe pulse per one FEC codeword of the downstream channel signal, and so that, during each of the probe pulses 111, the probe signal frequency f is swept across the channel bandwidth $B_{ch}$ over a time interval $t_i$ that is no greater than (m−1) symbol intervals $T_s$ of the downstream digital signal. This correspond to selecting the bandwidth B and/or the probe pulse duration $\tau$ so that $$t_i = \tau \cdot B_{ch}/B \leq (m-1) \cdot T_s, \quad (5)$$

or $$\tau \leq (m-1) \cdot T_s \cdot B/B_{ch} \quad (6)$$

By way of example for m=3, $B_{ch}$=6 MHz, B=80 MHz, and $T_s$=0.187 μs (256QAM signals), condition (6) yields that the duration of each probe signal 103 should not exceed about 4.97 μs. Further by way of example, the probe pulses are generated with the probe pulse period P not exceeding the RS codeword length or duration $T_{CW}$, which is about 47.756 μs for the 256QAM DOCSIS signal.

An analysis of the operation of the DOCSIS error correction schemes revealed that the convolutional de-interleaver specified by DOCSIS 3.0 may group together into a single codeword downstream symbols that experience collisions with different probe pulses even when the period of probe pulse generation P somewhat exceeds the codeword duration $T_{cd}$, but is smaller than the interleaver latency. However, this grouping does not occur if $P=T_{cd}$, i.e. if the generation of the probe pulses is synchronized with the codeword frequency $F_{cd}=1/T_{cd}$ in the downstream channel. Accordingly, in one embodiment tester 100 generates the sequence of the probe signals 103 that is synchronized to the codeword frequency $F_{cd}$ in the downstream digital signal.

A complication may arise when two different downstream channels that lie within the frequency band swept by the probe signal 101 utilize two different transmission formats that have differing symbol rates and therefore differing symbol and codeword durations. Accordingly, in one embodiment tester 100 generates the sequence of probe pulses that is synchronized to the codeword frequency for one of the two transmission formats that has a lower noise tolerance. By way of example, DOCSIS 3.0 specifies symbol rate of 5.056941 MHZ for 64QAM signals, and a slightly higher symbol rate of 5.360537 MHz for 256QAM signals. The codeword rates for these downstream signals are approximately 19.7 KHz and 20.9 KHz, respectively. However, the noise tolerance of the 256QAM signals are about 6 dB lower than that of the 64QAM signals. Accordingly, in this exemplary embodiment the probe pulses may be generated at the 256QAM codeword rate of about 20.9 KHz, or at any higher-order harmonics thereof.

The aforedescribed method for locating faults in the cable network may be implemented, for example, in a multi-purpose portable cable network tester that may be used by a technician in the field, and that may also implement other network test functions. For example, in embodiments wherein the probe pulse generator 112 and the matched filter 122 are implemented using a programmable hardware logic device such as an FPGA and the RSP 150 is implemented using a hardware processor such as a DSP executing software instructions, the same FPGA and the hardware processor may be shared to implement other network tests, such as for example those disclosed in U.S. Patent Documents No. 2015/0009795, 2015/0020129, and 2015/0009340, which are incorporated herein by reference. Implementing the aforedescribed TDR measurement technique in a portable cable network tester that can also perform measurements on upstream and downstream DTV signals may have an additional advantage of enabling to adjust the TDR parameters, such as the pulse probe power, duration and periodicity, in dependence on the DTV signals that are present in the network, so as to facilitate non-interfering TDR. For example, in one embodiment step 220 of the TDR measurement illustrated in FIG. 3 may be preceded by using the tester 100 to measure the power of the DS network signals 11 at the tester location in the DS channels that lie within, or overlap with, the frequency sweep ($f_{min}$, $f_{max}$) of the probe signal 101, and adjusting one of the probe pulse power, the probe pulse duration $\tau$, and the probe pulse period P in dependence on the measurements. For example, the probe pulse duration $\tau$ may be increased to gain SNR at the receiver 120. In one embodiment, tester 100 may perform symbol timing measurements in the DS transmission to ensure that the TDR probe pulse transmission is synchronized with the interleaver codewords.

The above-described exemplary embodiments are intended to be illustrative in all respects, rather than restrictive, of the present disclosure. Thus the present disclosure is capable of many variations in detailed implementation that can be derived from the description contained herein by a person skilled in the art. All such variations and modifications are considered to be within the scope and spirit of the present disclosure as defined by the following claims. All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Thus, the present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings, and such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

We claim:

1. A test instrument connectable to a network to provide time domain reflectometry (TDR) in a fault location measurement, comprising:
 a port connectable to a test point in a network, and the port to:
  transmit a frequency-chirped pulse probe signal into a network, wherein the frequency-chirped pulse probe signal comprises a probe pulse having a continuously varying probe signal frequency across a pre-defined probe frequency band over a duration of the probe pulse,
  receive a return signal from the network, and
 one or more processors to:
  perform a fault location measurement by analyzing the return signal to identify one or more peaks corresponding to the one or more echoes of the probe pulse reflected at a fault location in the network by:
   collecting a plurality of time-domain slices of the return signal synchronized to the sequence of the frequency-chirped probe pulses,
   averaging the plurality of time-domain slices of the return signal to obtain an average slice of the return signal, and
   subtracting a calibration measurement from the averaged slice of the return signal to provide a fault location measurement in the network.

2. The test instrument of claim 1, wherein the network is a cable television (CATV) network.

3. The test instrument of claim 1, wherein the network utilizes error correction coding for a downstream digital signal.

4. The test instrument of claim 3, wherein the error correction coding comprises correcting burst errors up to a maximum correctable burst duration, and wherein transmitting the frequency-chirped pulsed probe signal comprises varying the probe signal frequency over the channel bandwidth faster than the maximum correctable burst duration.

5. The test instrument of claim 3, wherein the error correction coding comprises:
 correcting m symbol errors per a codeword, where m is an integer greater than 1; and
 transmitting the pulsed probe signal comprises sweeping the probe signal frequency across the channel bandwidth over a time interval that is no greater than (m−1) symbol intervals of the downstream digital signal.

6. The test instrument of claim 3, wherein the error correction coding comprises using an interleaver, and wherein the frequency-chirped pulse probe signal comprises a sequence of probe pulses wherein two consecutive probe pulses are spaced apart by a time interval corresponding to at least a latency of the interleaver.

7. The test instrument of claim 1, wherein the network supports two transmission formats, and wherein transmitting the frequency-chirped pulse probe signal comprises generating a sequence of probe pulses synchronized to a codeword frequency for one of the two transmission formats having a lower noise tolerance than the other one of the two transmission formats.

8. The test instrument of claim 1, wherein the pre-defined probe frequency band comprises a probe signal bandwidth that is greater than a channel bandwidth of a downstream frequency channel of the network.

9. The test instrument of claim 1, wherein analyzing the return signal further comprises:
 filtering the return signal using a matched filter matched to the probe pulse; and
 amplifying one or more echoes of the probe pulse in the return signal.

10. The test instrument of claim 1, wherein analyzing the return signal further comprises aligning the time-domain slices in accordance with probe pulse positions in the return signal.

11. A method for performing a fault location measurement using time domain reflectometry (TDR) in a network, comprising:
 transmitting, by a port of a test instrument connectable to a test point in a network, a frequency-chirped pulse probe signal into a network, wherein the frequency-chirped pulse probe signal comprises a probe pulse having a continuously varying probe signal frequency across a pre-defined probe frequency band over a duration of the probe pulse, and wherein the network supports two transmission formats;
 receiving, by the port, a return signal from the network; and
 performing, at one or more processors of the test instrument, a fault location measurement by analyzing the return signal to identify one or more peaks corresponding to the one or more echoes of the probe pulse reflected at a fault location in the network, wherein the network utilizes error correction coding for a downstream digital signal, wherein the error correction coding comprises using an interleaver and correcting burst errors up to a maximum correctable burst duration and correcting m symbol errors per a codeword, where m is an integer greater than 1.

12. The method of claim 11, wherein the network is a cable television (CATV) network.

13. The method of claim 11, wherein transmitting the frequency-chirped pulsed probe signal comprises varying the probe signal frequency over the channel bandwidth faster than the maximum correctable burst duration.

14. The method of claim 11, wherein the error correction coding comprises:
   transmitting the frequency-chirped pulsed probe signal comprises sweeping the probe signal frequency across the channel bandwidth over a time interval that is no greater than (m−1) symbol intervals of the downstream digital signal.

15. The method of claim 11, wherein the frequency-chirped pulse probe signal comprises a sequence of probe pulses wherein two consecutive probe pulses are spaced apart by a time interval corresponding to at least a latency of the interleaver.

16. The method of claim 11, wherein transmitting the frequency-chirped pulse probe signal comprises generating a sequence of probe pulses synchronized to a codeword frequency for one of the two transmission formats having a lower noise tolerance than the other one of the two transmission formats.

17. The method of claim 11, wherein the pre-defined probe frequency band comprises a probe signal bandwidth that is greater than a channel bandwidth of a downstream frequency channel of the network.

18. The method of claim 11, wherein analyzing the return signal further comprises:
   filtering the return signal using a matched filter matched to the probe pulse; and
   amplifying one or more echoes of the probe pulse in the return signal.

19. The method of claim 11, wherein analyzing the return signal further comprises aligning the time-domain slices in accordance with probe pulse positions in the return signal.

20. A non-transitory computer-readable storage medium having an executable stored thereon, which when executed instructs one or more processors to perform the method of claim 11.

* * * * *